United States Patent [19]

McLarty et al.

[11] Patent Number: 5,470,158
[45] Date of Patent: Nov. 28, 1995

[54] SEAL FOR ROLLING BEARINGS

[75] Inventors: Daniel R. McLarty, Burlington; Salvatore Acampora, Bristol, both of Conn.

[73] Assignee: The Torrington Company, Torrington, Conn.

[21] Appl. No.: 366,355

[22] Filed: Dec. 29, 1994

[51] Int. Cl.[6] .................................................. F16C 33/78
[52] U.S. Cl. ...................... 384/484; 277/152; 277/178
[58] Field of Search ................................. 384/484, 485, 384/486, 488, 477; 277/178, 152, 215, 37

[56] References Cited

U.S. PATENT DOCUMENTS

| | | | |
|---|---|---|---|
| 1,498,674 | 6/1924 | Runge | 384/488 X |
| 2,031,571 | 2/1936 | Nilsson | 384/488 |
| 2,034,567 | 3/1936 | Fernstrom | 384/488 |
| 2,141,145 | 12/1938 | Wooler et al. | 384/488 X |
| 2,375,166 | 5/1945 | Cooper | 384/488 X |
| 2,902,300 | 9/1959 | Schultz | 384/488 |
| 3,396,977 | 8/1968 | Iguchi | 384/488 |
| 3,423,141 | 1/1969 | Pethis | 384/484 X |
| 3,597,030 | 8/1971 | Hallerback | 384/488 |
| 3,672,736 | 6/1972 | Rathbone | 384/488 |
| 4,183,592 | 1/1980 | Sudo et al. | 384/488 |
| 4,512,672 | 4/1985 | Olschewski et al. | 384/487 |
| 4,557,612 | 12/1985 | Neal | 384/488 |
| 4,588,312 | 5/1986 | Dickinson et al. | 384/484 X |
| 4,643,594 | 2/1987 | Neder et al. | 384/488 |
| 4,697,936 | 10/1987 | Bermond et al. | 384/484 |
| 4,854,749 | 8/1989 | Kohigashi et al. | 384/488 |
| 4,874,261 | 10/1989 | Colanzi et al. | 384/484 |
| 4,946,295 | 8/1990 | Hijzler | 384/448 |
| 4,969,423 | 11/1990 | Kitauchi et al. | 123/65 R |

Primary Examiner—Thomas R. Hannon
Attorney, Agent, or Firm—John C. Bigler

[57] ABSTRACT

An annular sealing groove is provided at an axial end of one of an outer or inner bearing ring. The seal element comprises an annular ring of an elastomeric material with a plurality of circumferentially periodic radially extending projections integrally formed in an outer periphery or an inner periphery thereof. The projections are configured to provide an interference fit in the radial direction with respect to a bottom wall and outer side wall of the sealing groove to effect a seal. Preferably, the radial interference fit of the seal element biases the seal element axially against an inner side wall of the sealing groove.

12 Claims, 3 Drawing Sheets

SEAL FOR ROLLING BEARINGS

BACKGROUND OF THE INVENTION

This invention relates generally to a sealing device for rolling element bearings and, more particularly, to a sealing device that compensates for dimensional variations of bearing elements within wider tolerances than sealing devices of the prior art.

In rolling element bearing assemblies, rolling elements are provided in an annular space between outer and inner bearing rings, to reduce friction. It is common to provide sealing devices at the axial ends of such bearing assemblies to retain lubricant within the bearing assembly and to exclude foreign matter from the bearing assembly, where it may cause damage to the rolling elements or the bearing races. Typically, such sealing devices are retained against one bearing ring, turning with that bearing ring while being engageable with the other bearing ring to effect a seal.

In some prior art sealing devices of this type, a substantially rigid elastomeric seal element is installed in an annular sealing groove in one bearing ring. The sealing groove may be a V-shaped groove at an axial end of the bearing ring. A continuous periphery of the seal element is compressed radially inwardly, to allow installation of the seal element over a retaining surface. Due to its resiliency, the seal element then expands radially outwardly into the sealing groove to effect a seal with the bearing ring.

The periphery of the seal element of such sealing devices must be precisely matched to the sealing groove. Excessive interference may result in folding, or buckling, of the periphery of the seal element, preventing the desired seal. Similarly, inadequate interference may result in insufficient biasing of the seal element into the sealing groove to effect the desired seal. The cost of maintaining sufficiently close tolerances in manufacturing both the bearing ring and the elastomeric seal element inflates the price of prior art rolling element bearing assemblies of this type.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a seal element for a rolling element bearing having outer and inner bearing rings and a plurality of rolling elements within an annular space therebetween. An annular sealing groove is provided at an axial end of one of the bearing rings. The seal element comprises an annular ring of an elastomeric material with a plurality of circumferentially periodic radially extending projections integrally formed in an outer periphery or an inner periphery thereof. The projections are configured to provide an interference fit in the radial direction with respect to a bottom wall and an outer side wall of the sealing groove to effect a seal.

The foregoing and other aspects will become apparent from the following detailed description of the invention when considered in conjunction with the accompanying drawing figures

BRIEF DESCRIPTION OF THE DRAWING FIGURES

DETAILED DESCRIPTION

Figure 1:
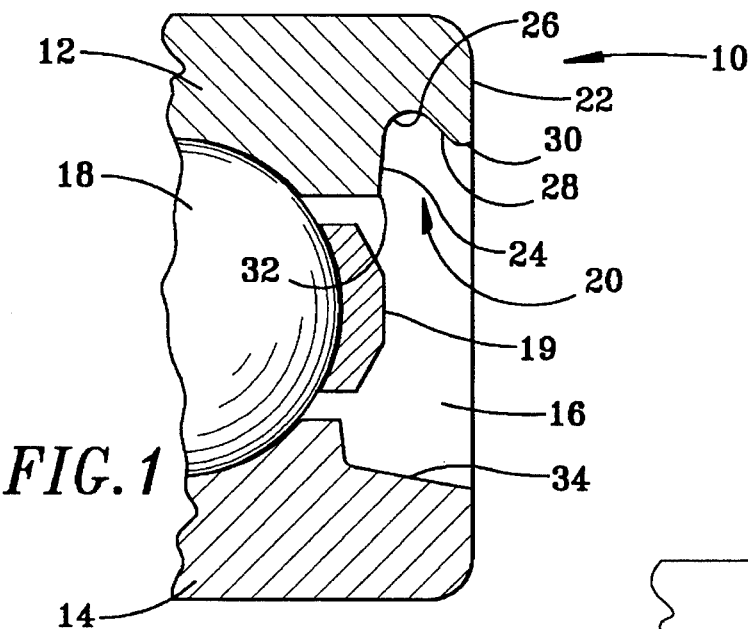
FIG. 1 is a cross-sectional view illustrating a rolling element bearing prior to installation of the seal element of the present invention.

Referring now to the drawings, FIG. 1 illustrates rolling element bearing 10 prior to installation of the seal element of the present invention. Rolling element bearing 10 includes outer and inner bearing rings 12 and 14, respectively, having a common central axis 15 (indicated in FIG. 4) and defining annular space 16 therebetween. Rolling elements 18 within annular space 16 are circumferentially located by bearing retainer 19 and may be balls are shown, for example, or may be tapered, spherical or cylindrical rollers of various types.

Annular sealing groove 20 is provided within the radially inward surface of outer bearing ring 12 at axial end 22 and is defined by substantially radial inner side wall 24, curved bottom wall 26, tapered outer side wall 28, and rounded lip 30. These defined surfaces together form a contiguous outline, in cross-section, extending axially inwardly and radially outwardly from rounded lip 30, along tapered outer side wall 28 and curved bottom wall 26, and then axially inwardly and radially inwardly along curved bottom wall 26 and substantially radial inner side wall 24, and terminating at point 32 with a diameter smaller than the diameter of rounded lip 30. Substantially radial inner side wall 24 may be inclined to provide a draft angle, as shown.

Inner bearing ring 14 includes, on its radially outward surface, tapered surface 34, comprising a convex conical surface opposite annular sealing groove 20. Tapered surface 34 extends axially inwardly and radially outwardly from axial end 22 as a ramp. Other configurations of inner ring 14 may be provided if a labyrinth or other noncontact seal is desired.

Figure 2:
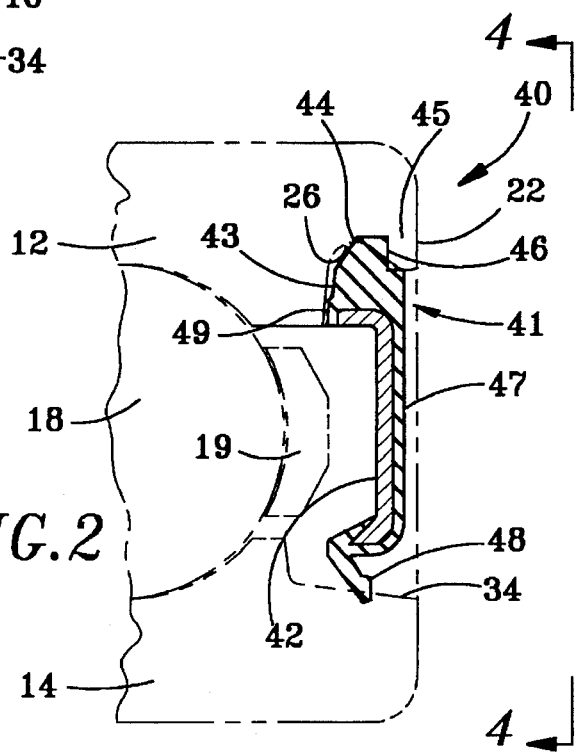
FIG. 2 is a cross-sectional view illustrating one embodiment of the seal element of the present invention, with the rolling element bearing of FIG. 1 shown in phantom.

Seal element 40, shown in FIG. 2, comprises elastomeric portion 41 and metal reinforcing portion 42, that is C-shaped in cross-section. Elastomeric portion 41 extends axially outwardly and radially outwardly from the outer perimeter of metal reinforcing portion 42 as substantially radial surface 43, and ramp surface 44, then axially outwardly as cylindrical portion 45 and notch portion 46, before reaching flat axial end surface 47. Elastomeric portion 41 may include sealing lip 48, as shown, or other conventional configuration, such as a labyrinth seal, for example, at its inner perimeter. Elastomeric portion 41 does not cover the open side of C-shaped reinforcing portion 42, that faces axially inwardly and provides clearance for rolling elements 18 and bearing retainer 19.

The phantom lines of FIG. 2 show the elements of rolling element bearing 10 in relationship to seal element 40. Substantially radial surface 43 is parallel to substantially radial inner side wall 24 but is offset axially inwardly by annular sealing surface 49. Significantly, ramp surface 44 extends radially outwardly of curved bottom wall 26 and tapered side outer wall 28 such that cylindrical portion 45 forms an interference fit in the radial direction. Notch 46 is located such that the radially outward edge of flat axial end surface 47 is positioned at rounded lip 30. Flat axial end surface 47 is recessed slightly with respect to axial end 22. Sealing lip 48 extends radially outward of tapered surface 34.

Figure 3:
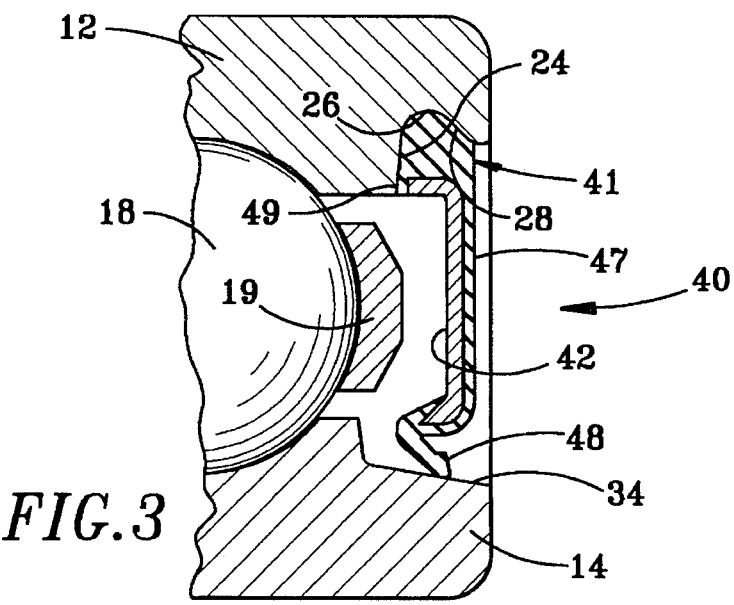
FIG. 3 is a cross-sectional view illustrating the rolling element bearing of FIG. 1 after installation of the seal element of FIG. 2.

FIG. 3 illustrates rolling element bearing 10 after seal element 40 has been pressed axially inwardly to its assembled position. Sealing surface 49 has been forced tightly against substantially radial inner side wall 24 to effect a seal. Ramp surface 44 and cylindrical portion 45 have been compressed radially inwardly to conform to curved bottom wall 26 and tapered outer side wall 28, imparting an axial force to sealing surface 49. Sealing lip 48 has been deflected axially outwardly and engages tapered surface 34 to provide a sliding contact seal.

Figure 4:
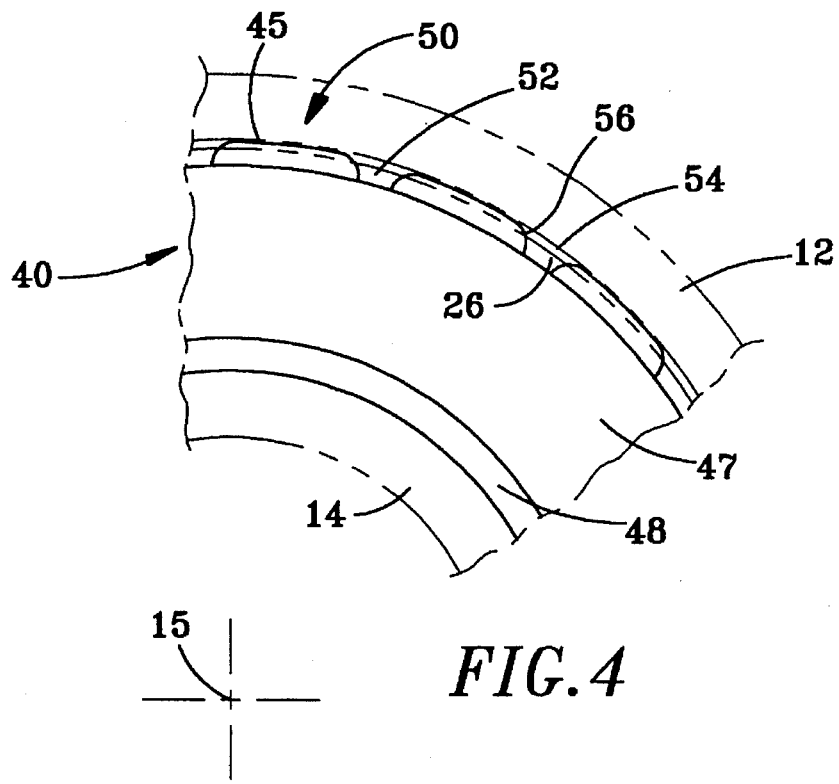
FIG. 4 is an axial view of the seal element of FIG. 2, as indicated by line 4—4, with the rolling element bearing of FIG. 1 shown in phantom.

FIG. 4 illustrates seal element 40 of FIG. 2 as viewed in the axial direction. Seal element 40 is characterized by circumferentially periodic and radially extending projections 50, having a generally D-shaped configuration, along its outer periphery with circumferentially extending spaces 52 between them. Circular trace 54 of the radially outward ends of projections 50 corresponds to cylindrical portion 45. Projections 50 have rounded side portions 56. Circumferentially extending spaces 52 allow expansion of projections 50 in a circumferential direction when seal element 40 is pressed past rounded lip 30 when seal element 40 is assembled in rolling element bearing 10.

Figure 5:
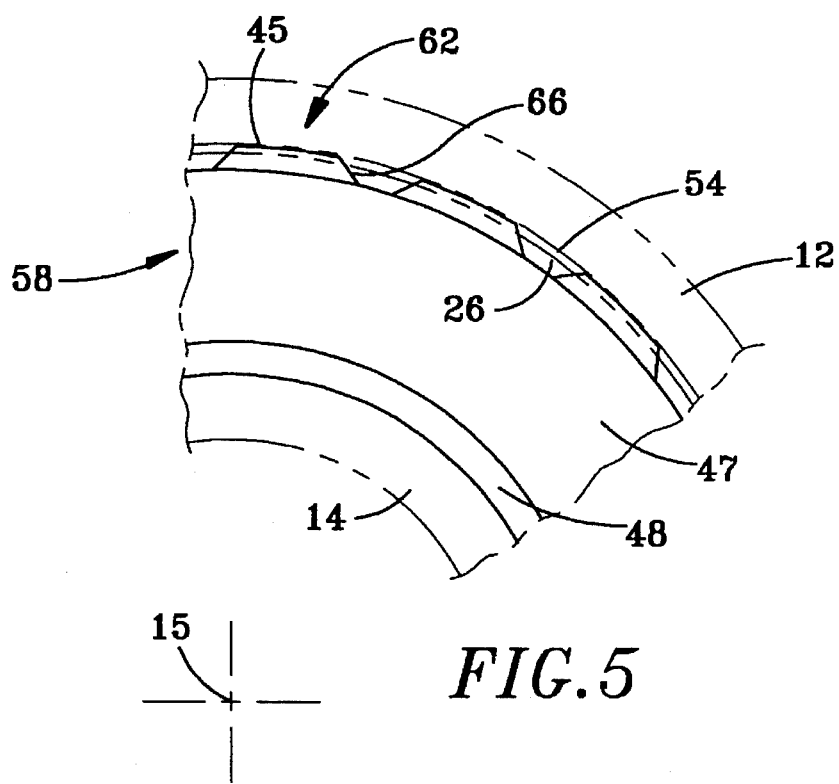
FIG. 5 is an axial view, similar to FIG. 4, illustrating a second embodiment of the seal element of the present invention.
Figure 6:
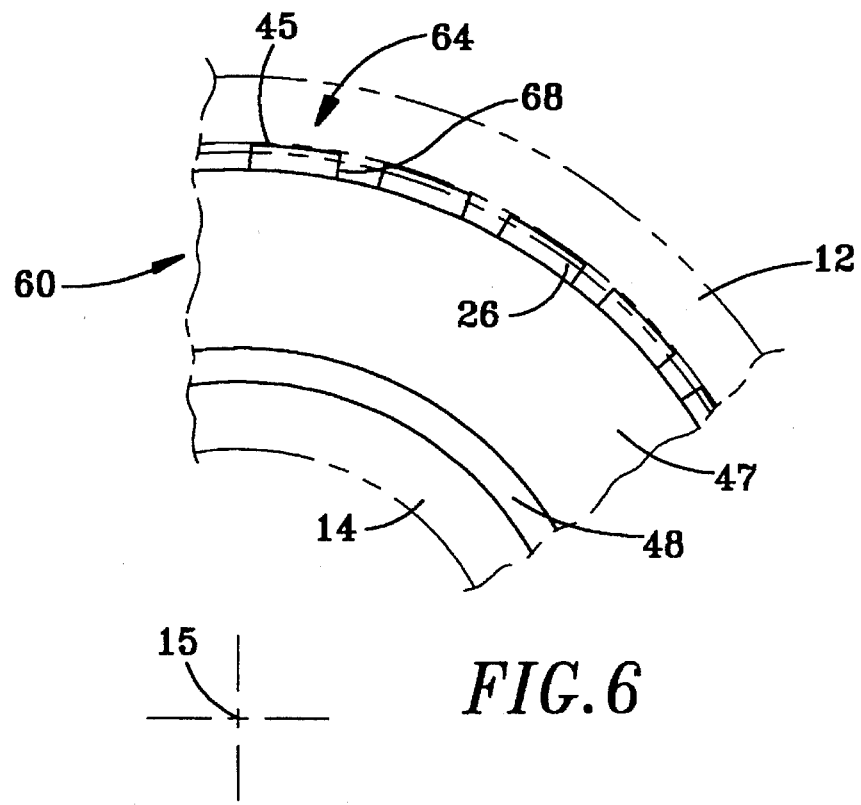
FIG. 6 is an axial view, similar to FIG. 4, illustrating a third embodiment of the seal element of the present invention.

FIGS. 5 and 6 illustrate alternative embodiments of the present invention as seal elements 58 and 60, with circumferentially periodic and radially extending projections 62 and 64, respectively. Projections 62 have a generally trapezoidal configuration, in axial view, with cylindrical portion 45 and straight angled side portions 66. Projections 64 have a generally rectangular configuration, in axial view, with cylindrical portion 45 and substantially radial side portions 68. In each of these alternative embodiments, the cross-section of the seal element is the same as that of seal element 40, as illustrated in FIG. 2, and the same reference numerals are used for identical portions.

Figure 7:
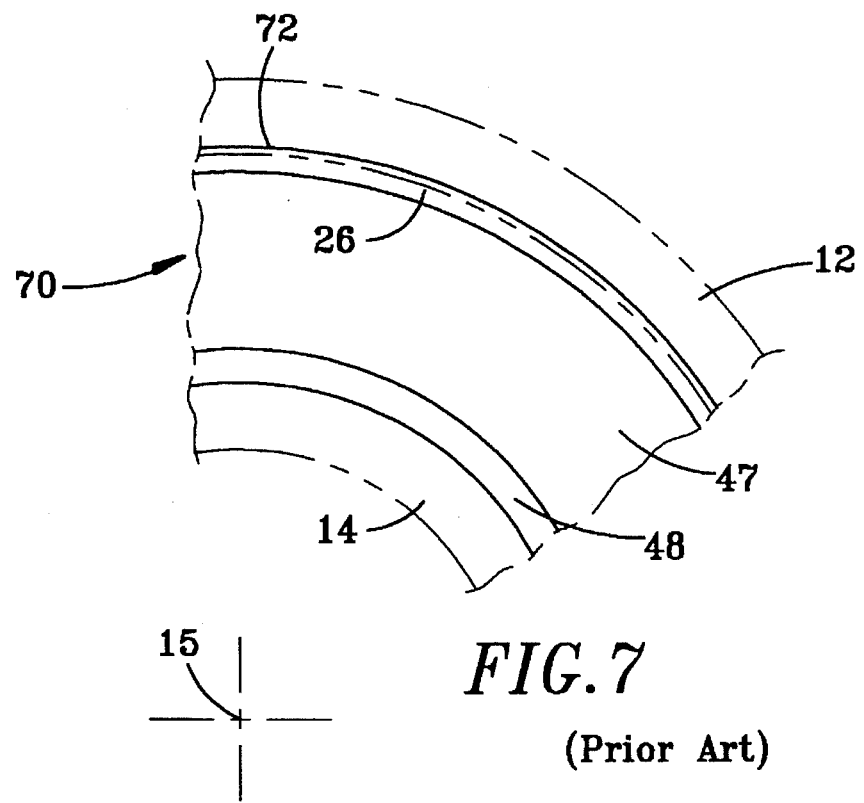
FIG. 7 is an axial view, similar to FIG. 4, illustrating a seal element according to the prior art.

In contrast to the seal element of the present invention, FIG. 7 illustrates prior art seal element 70 over which this invention is an improvement. It can be seen that periphery 72 of prior art seal element 70 is continuous and uninterrupted. When seal element 70 is pressed into annular sealing groove 20 without the desired dimensional tolerances, periphery 72 may be in compression without adequate relief. The resulting pressure within the elastomeric material may cause folding, buckling or other deformation of sealing surface 42 and render the seal ineffective, allowing contaminants to enter the bearing or lubricant to escape. For comparison, seal element 70 is shown with flat end surface 74 and sealing lip 76 that are similar to flat end surface 47 and sealing lip 48, respectively.

The present invention is characterized mainly in that the sealing device includes a sealing element of substantially rigid elastomeric material, with or without metal reinforcement, one edge being provided with a plurality of circumferentially periodic radially extending resilient projections that are deformable to permit installation in a groove of a bearing ring. After installation, the projections remain slightly deformed to bias a sealing surface of the sealing element against the bearing ring to maintain a seal.

From the above description, it will be apparent that the present invention provides a sealing device that accommodates a wider range of dimensional variations than prior art sealing devices without folding, buckling or other distortion of the seal element that would destroy the seal. The seal element may be installed on the inside diameter of an outer bearing ring, as illustrated, or, alternatively, on the outside diameter of an inner bearing ring. In the latter case, the inner periphery of the seal element has the circumferentially periodic and radially extending projections installed in an annular sealing groove of the inner bearing ring.

Having described the invention, what is claimed is:

1. A seal element for a rolling element bearing having outer and inner bearing rings and a plurality of rolling elements within an annular space therebetween, one of the bearing rings having an annular sealing groove at an axial end of the bearing ring, the sealing groove having a curved bottom wall, substantially radially directed inner side wall and tapered outer side wall, the seal element comprising:

an annular ring of an elastomeric material, the annular ring having an outer periphery and an inner periphery;

a plurality of circumferentially periodic radially extending projections integrally formed in one of the outer periphery and the inner periphery of the annular ring, the projections being segments of a radially extending ridge;

said projections being configured to provide an interference fit in the radial direction with respect to the curved bottom wall and the tapered outer side wall of the sealing groove such that the sealing groove compresses the elastomeric material and thereby imparts an axial force on the seal element to effect a seal between the seal element and the inner side wall of the sealing groove to effect a seal.

2. The seal element according to claim 1, wherein the seal element extends radially from said projections to substantially close the annular space between the outer bearing ring and the inner bearing ring.

3. The seal element according to claim 1, further comprising a sealing lip formed integrally with the annular ring and extending radially to engage the other of the outer bearing ring and the inner bearing ring as a sliding contact seal.

4. The seal element according to claim 1, wherein the sealing groove is on the outer bearing ring and said projections are on the outer periphery of the annular ring.

5. The seal element according to claim 1, further comprising an annular metal reinforcement member.

6. The seal element according to claim 5, wherein the annular metal reinforcement member is C-shaped in cross section, with the open portion of the C-shaped cross section directed axially inwardly, such that clearance is provided for the rolling elements and a bearing retainer when provided.

7. The seal element according to claim 1, wherein the inner side wall of the sealing groove is substantially radial, and wherein the annular ring has a substantially radial surface such that the interference fit of said projections with respect to the sealing groove biases the substantially radial surface of the annular ring against the inner side wall of the sealing groove to effect the seal.

8. The seal element according to claim 7, wherein the substantially radial surface of the annular ring includes an annular sealing surface that is offset axially inwardly to effect said seal against the inner side wall of the sealing groove.

9. The seal element according to claim 1, wherein said projections are substantially D-shaped as viewed in the axial direction, the projections having an arcuate perimeter, defined by a circular trace of the radially outward ends of the seal element, and curved side portions.

10. The seal element according to claim 1, wherein said projections are substantially trapezoidal as viewed in the axial direction, the projections having an arcuate perimeter, defined by a circular trace of the radially outward ends of the seal element, and angled, straight side portions.

11. The seal element according to claim 1, wherein said projections are substantially rectangular as viewed in the axial direction, the projections having an arcuate perimeter, defined by a circular trace of the radially outward ends of the seal element, and substantially radial, straight side portions.

12. The seal element according to claim 1, wherein said projections include a ramp surface engageable with said one of the outer and inner bearing rings such that said projections are deformed resiliently when the seal element is pressed axially into the sealing groove during installation.

* * * * *